United States Patent
Lee et al.

(10) Patent No.: US 7,274,158 B2
(45) Date of Patent: Sep. 25, 2007

(54) SYSTEM FOR DRIVING PLURAL LAMPS

(75) Inventors: Chi-Hsiung Lee, Tu-Cheng (TW); Yu-Hsiao Chao, Tu-Cheng (TW); Che-Chen Fan Chiang, Tu-Cheng (TW); Cheng-Chueh Tsai, Tu-Cheng (TW); Shian-Nan Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/314,050

(22) Filed: Dec. 20, 2005

(65) Prior Publication Data

US 2006/0145637 A1 Jul. 6, 2006

(30) Foreign Application Priority Data

Dec. 31, 2004 (TW) .............................. 93141613 A

(51) Int. Cl.
*G05F 1/00* (2006.01)
(52) U.S. Cl. .................. 315/291; 315/224; 315/209 R; 315/247; 315/312; 315/307; 315/DIG. 5
(58) Field of Classification Search ............ 315/209 R, 315/224, 225, 219, 247, 291, 244, 307, 312, 315/360, 362, 276, DIG. 2, DIG. 4, DIG. 5, 315/DIG. 7
See application file for complete search history.

(56) References Cited

U.S. PATENT DOCUMENTS

| | | | | |
|---|---|---|---|---|
| 6,104,146 A | * | 8/2000 | Chou et al. ................. | 315/277 |
| 6,316,881 B1 | * | 11/2001 | Shannon et al. ............ | 315/219 |
| 6,750,842 B2 | * | 6/2004 | Yu .............................. | 345/102 |
| 6,781,325 B2 | * | 8/2004 | Lee ............................. | 315/282 |
| 6,936,975 B2 | * | 8/2005 | Lin et al. .................... | 315/224 |
| 6,947,024 B2 | * | 9/2005 | Lee et al. ................... | 345/102 |
| 6,969,958 B2 | * | 11/2005 | Henry ........................ | 315/291 |
| 2004/0032223 A1 | | 2/2004 | Henry ........................ | 315/291 |

* cited by examiner

*Primary Examiner*—Haissa Philogene
(74) *Attorney, Agent, or Firm*—Morris Manning & Martin LLP; Tim Tingkang Xia, Esq.

(57) ABSTRACT

A system for driving a lamp module (13) includes a converter (11), a driving circuit (12), and a pulse width modulation (PWM) controller (14). The lamp module includes a plurality of lamps. The converter converts a received voltage to a direct current (DC) voltage. The driving circuit converts the DC voltage to an alternating current (AC) voltage. The PWM controller is connected between the converter and the lamp module, for regulating the DC voltages outputted from the converter according to current flowing through the lamps of the lamp module. In one embodiment, the system includes a bus inverter controller. The bus inverter controller is connected between the driving circuit and the lamp module, for regulating a working frequency thereof and controlling the AC voltage outputted from the driving circuit when the lamps are turned on. The system has a reduced number of PWM controllers and a relatively low cost.

19 Claims, 5 Drawing Sheets

SYSTEM FOR DRIVING PLURAL LAMPS

BACKGROUND

1. Field of the Invention

The present invention relates to systems for driving plural or multiple lamps, and particularly to a system typically used for driving plural or multiple lamps of a backlight module of a liquid crystal display (LCD).

2. Related Art

Generally, a discharge lamp used as a light source of a liquid crystal display (LCD) panel has a terminal voltage characteristic that varies according to the frequency of alternating current applied to the discharge lamp. The discharge lamp also exhibits a negative impedance characteristic whereby the impedance decreases upon an increase in input power. A circuit for driving the discharge lamp can for example be an inverter. The circuit should be configured with a controllable alternating current power supply and a feedback loop, for monitoring the current flowing through the lamp to ensure stable operation and to regulate the load as well.

A conventional system for driving plural lamps normally requires two pulse width modulation (PWM) controllers. FIG. 5 is a block diagram of a conventional system for driving plural lamps. The system comprises a converter 1, a bridge driving circuit 2, a lamp module 3, a PWM controller 4, and a bridge controller 5. The converter 1 converts a received direct current (DC) voltage or alternating current (AC) voltage to a DC voltage. The bridge driving circuit 2 converts the DC voltage received from the converter 1 to an AC voltage. The AC voltage is used for igniting lamps in the lamp module 3. The PWM controller 4 receives the DC voltage outputted from the converter 1, and generates a feedback signal to control the converter 1 to output a fixed DC voltage. The bridge controller 5 is another PWM controller, which is connected between the lamp module 3 and the bridge driving circuit 2. The bridge controller 5 is used for controlling the bridge driving circuit 2, in order to regulate current flowing through the lamp module 3.

Thus, the conventional system for driving plural lamps uses two PWM controllers. The two PWM controllers respectively receive different feedback signals to control the system. One is used for regulating current flowing through the lamps, and the other is used for fixing the DC voltage outputted from the converter 1. A PWM controller is expensive, especially a PWM controller used for driving a multi-lamp module. Therefore, the cost of the conventional driving system requiring two of the PWM controllers is inevitably high.

It is desired to provide a system for driving plural or multiple lamps such as those of an LCD, the system having a reduced number of PWM controllers and a relatively low cost.

SUMMARY

Certain embodiments of the invention provide a system for driving a lamp module, the system comprising a converter, a driving circuit, and a pulse width modulation (PWM) controller. The lamp module comprises a plurality of lamps. The converter converts a received voltage to a direct current (DC) voltage. The driving circuit converts the DC voltage to an alternating current (AC) voltage. The PWM controller is connected between the converter and the lamp module, for regulating the DC voltages outputted from the converter according to current flowing through the lamps of the lamp module. The system further comprises a bus inverter controller. The bus inverter controller is connected between the driving circuit and the lamp module, for regulating a working frequency thereof and controlling the AC voltage outputted from the driving circuit when the lamps are turned on.

Certain other embodiments of the invention provide a system for driving lamp modules, the system comprising a plurality of converters, a plurality of driving circuits and a multi-phase PWM controller. Each lamp module comprises a plurality of lamps. The converters convert received voltages to DC voltages. The driving circuits convert the DC voltages to AC voltages. The multi-phase PWM controller is connected between the converters and the lamp modules, for regulating the DC voltages outputted from the converters according to currents flowing through the lamp modules. The system further comprises a bus inverter controller. The bus inverter controller is connected between the driving circuits and the lamp modules, for regulating a working frequency of the bus inverter controller and controlling the AC voltages outputted from the driving circuits when the lamps are turned on.

Other advantages and novel features will be drawn from the following detailed description of preferred embodiments of the present invention with the attached drawings, in which:

DETAILED DESCRIPTION OF EMBODIMENTS

Figure 1:
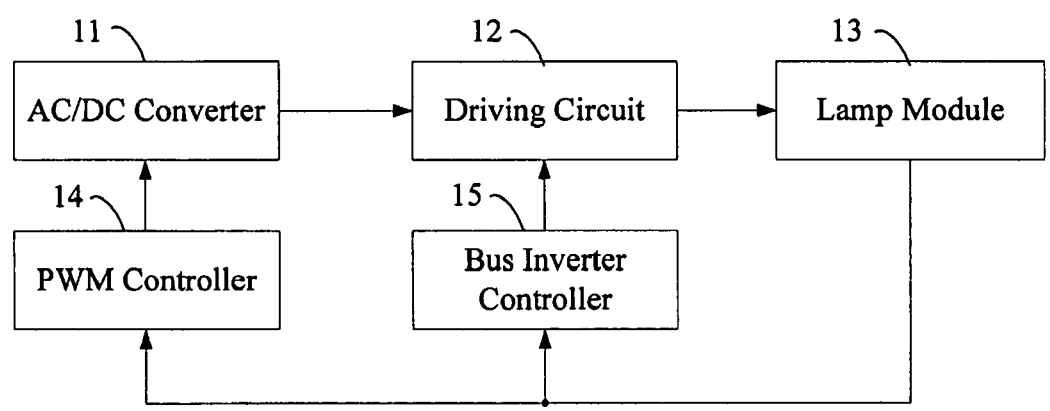
FIG. 1 is a block diagram of a first embodiment of a system for driving plural lamps in accordance with the present invention.

FIG. 1 is a block diagram of a first embodiment of a system for driving plural lamps in accordance with the present invention. The system comprises an alternating current/direct current (AC/DC) converter 11, a driving circuit 12, a lamp module 13, a pulse width modulation (PWM) controller 14, and a bus inverter controller 15. The lamp module 13 comprises a plurality of lamps.

The AC/DC converter 11 receives an AC voltage from an AC power source (not shown) to convert the AC voltage to a DC voltage. The driving circuit 12 is electrically connected to the AC/DC converter 11 to convert the DC voltage to another AC voltage.

In the first embodiment, the driving circuit 12 may be a half-bridge circuit, a full-bridge circuit, a pull-push circuit or a royer circuit.

The lamp module 13 is electrically connected to the driving circuit 12, for receiving the AC voltage provided by the driving circuit 12. The AC voltage is used for lighting the lamps in the lamp module 13.

The bus inverter controller 15 is electrically connected between the lamp module 13 and the driving circuit 12, for lighting the lamp module 13. When the lamps in the lamp module 13 are being turned on, a high AC voltage is needed to drive the lamps. Once the lamps are turned on, a stable AC voltage is needed to drive the lamps. Correspondingly, a working frequency of the bus inverter controller 15 can be changed if the lamps are being turned on, and the working frequency becomes stable once the lamps are turned on. Therefore, when the lamps in the lamp module 13 are being turned on, the lamp module 13, the bus inverter controller 15, and the driving circuit 12 form a loop, in which no current flows through the lamp module 13, and the bus inverter controller 15 increases the working frequency thereof to control the driving circuit 12 to output a higher AC voltage for lighting the lamp module 13. Once the lamps in the lamp module 13 are turned on, current flows through the lamp module 13, and the working frequency of the bus inverter controller 15 is dropped to a preset value. The preset value is a stable working frequency of the bus inverter controller 15.

The PWM controller 14 is electrically connected between the lamp module 13 and the AC/DC converter 11, for generating a control signal sent to the AC/DC converter 11 according to a feedback current outputted from the lamp module 13. The AC/DC converter 11 changes DC voltage outputted therefrom based on the control signal, thereby changing a brightness of the lamps in the lamp module 13 via the driving circuit 12. In the first embodiment, the DC voltage outputted from the AC/DC converter 11 is variable. Therefore, when the lamps in the lamp module 13 are turned on and the brightnesses thereof are uneven, the lamp module 13, the PWM controller 14 and the AC/DC converter 11 form a loop, and the DC voltage outputted from the AD/DC converter 11 is changed according to the feedback current flowing through the loop.

In an alternative embodiment, when the lamps in the lamp module 13 are being turned on, the driving circuit 12 is controlled to output a higher AC voltage via the PWM controller 14 and the AC/DC converter 11, instead of via the bus inverter controller 15.

Figure 2:
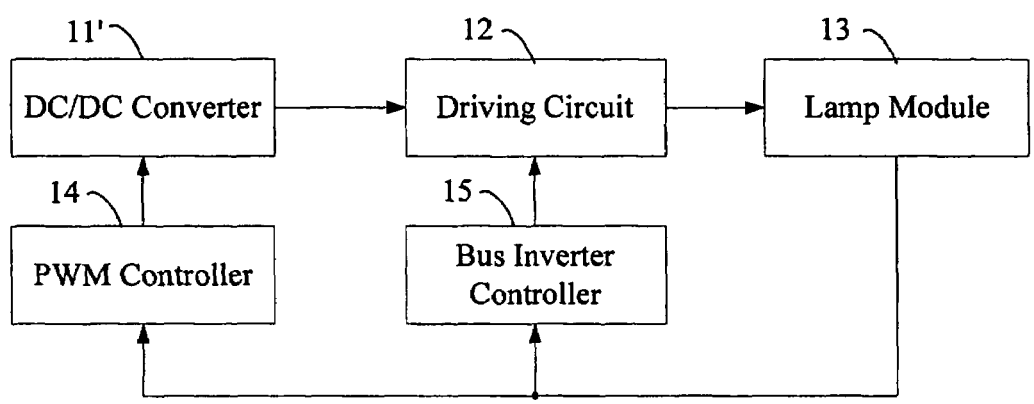
FIG. 2 is a block diagram of a second embodiment of a system for driving plural lamps in accordance with the present invention.

FIG. 2 is a block diagram of a second embodiment of a system for plural lamps in accordance with the present invention. The circuit structure shown in FIG. 2 is substantially the same as that of the FIG. 1, except that the circuit has a DC/DC converter 11' instead of an AC/DC converter 11. Thus, a detailed description of other elements of the system is omitted herefrom. The DC/DC converter 11' in FIG. 2 is used for receiving a DC voltage from a DC power source (not shown).

When there are a plurality of lamp modules in the system and the driving circuit 12 cannot supply sufficient power, the invention provides other embodiments as follows.

Figure 3:
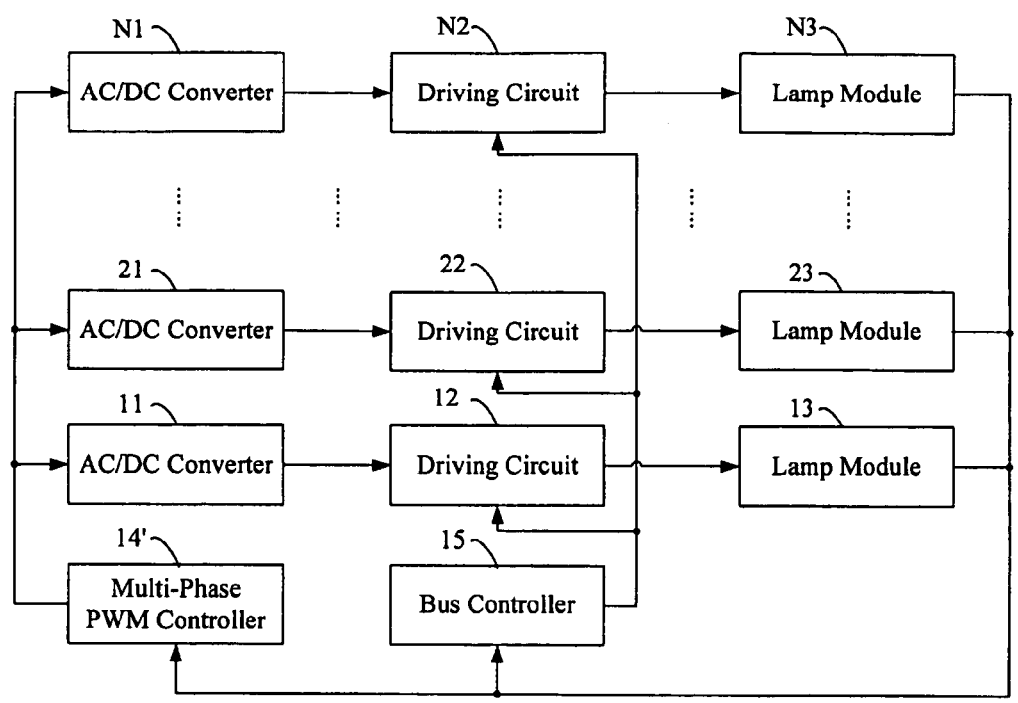
FIG. 3 is a block diagram of a third embodiment of a system for driving plural lamps in accordance with the present invention.

FIG. 3 is a block diagram of a third embodiment of a system for driving plural lamps in accordance with the present invention. The system comprises a plurality of AC/DC converters 11, 21, . . . , N1, a plurality of driving circuits 12, 22, . . . , N2, a plurality of lamp modules 13, 23, . . . , N3, a multi-phase PWM controller 14', and a bus inverter controller 15.

In the third embodiment, each of the driving circuits 12, 22, . . . , N2 may be a half-bridge circuit, a full-bridge circuit, a pull-push circuit or a royer circuit.

The AC/DC converters 11, 21, . . . , N1, the driving circuits 12, 22, . . . , N2, and the lamp modules 13, 23, . . . , N3 have similar connections to those of the AC/DC converter 11, the driving circuit 12 and the lamp module 13 as shown in FIG. 1.

The multi-phase PWM controller 14' is electrically connected between the AC/DC converters 11, 21, . . . , N1 and the lamp modules 13, 23, . . . , N3. The bus inverter controller 15 is electrically connected between the driving circuits 12, 22, . . . , N2 and the lamp modules 13, 23, . . . , N3.

The multi-phase PWM controller 14' generates control signals to control corresponding AC/DC converters 11, 21, . . . , N1 according to different preset periods. The AC/DC converters 11, 21, . . . , N1 correspondingly receive AC voltages from an AC power source (not shown) according to the control signals in corresponding preset periods.

In a first preset period, the multi-phase PWM controller 14' controls the AC/DC converter 11 to receive the AC voltage from the AC power source. The AC/DC converter 11 converts the AC voltage to the DC voltage. The driving circuit 12 converts the DC voltage generated by the AC/DC converter 11 to the AC voltage, in order to light up the lamps in the lamp module 13. Similarly, when the lamps in the lamp module 13 are being turned on, and there is no current flowing through the lamps in the lamp module 13, the bus inverter controller 15 increases the working frequency thereof, and controls the driving circuit 12 to output a higher AC voltage for lighting the lamp module 13. Once the lamps in the lamp module 13 are turned on, the working frequency of the bus inverter controller 15 is dropped to a stable frequency.

When the lamps in the lamp module 13 are turned on in a first preset period, correspondingly, in an Nth (N=2, 3 . . . ) preset period, the multi-phase PWM controller 14' controls the AC/DC controller N1 (N=2, 3 . . . ) to receive an AC voltage from the AC power source. The AC/DC controller N1 (N=2, 3 . . . ) converts the AC voltage received to a DC voltage. The driving circuit N2 (N=2, 3 . . . ) converts the DC voltage to an AC signal, in order to turn on the lamps in the lamp module N3 (N=2, 3 . . . ). Similarly, when the lamps in the lamp module N3 (N=2, 3 . . . ) are being turned on, and there is no current flowing through the lamps in the lamp module N3 (N=2, 3 . . . ), the bus inverter controller 15 increases the working frequency thereof, and controls the driving circuit N2 (N=2, 3 . . . ) to output a higher AC voltage for lighting the lamp module N3 (N=2, 3 . . . ).

When the lamps in the lamp modules 13, 23, . . . , N3 are turned on, however, the brightnesses of the lamps are uneven. The multi-phase PWM controller 14' regulates the DC voltage outputted from the AC/DC converter 11, 21, . . . , N1 to change the brightnesses of the lamps according to the preset periods.

Correspondingly, in the Nth (N=1, 2, 3 . . . ) preset period, the multi-phase PWM controller 14' receives a feedback current from a corresponding lamp module 13, 23, . . . , or N3, and outputs control signals to the corresponding AC/DC converter 11, 21, . . . , or N1. The AC/DC converter 11, 21, . . . , or N1 regulates the outputted DC voltage thereof, in order to change the brightnesses of the lamps in the lamp module 13, 23, . . . , or N3. In the third embodiment, the DC voltages outputted from the AC/DC converters 11, 21, . . . , N1 are variable.

Figure 4:
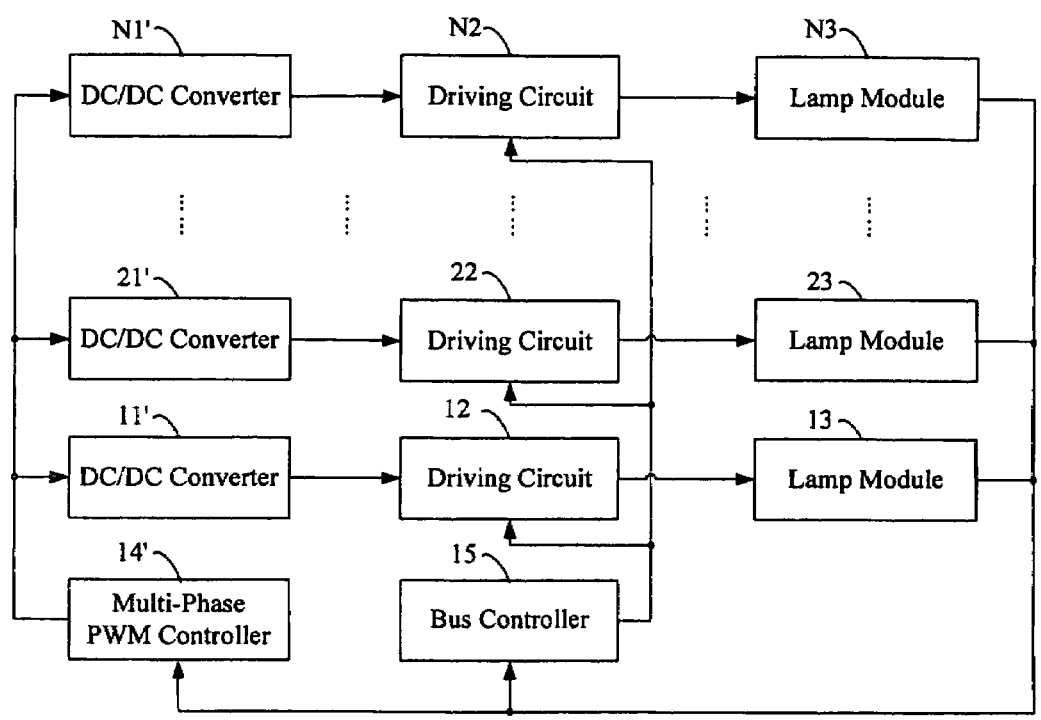
FIG. 4 is a block diagram of a fourth embodiment of a system for driving plural lamps in accordance with the present invention.
Figure 5:
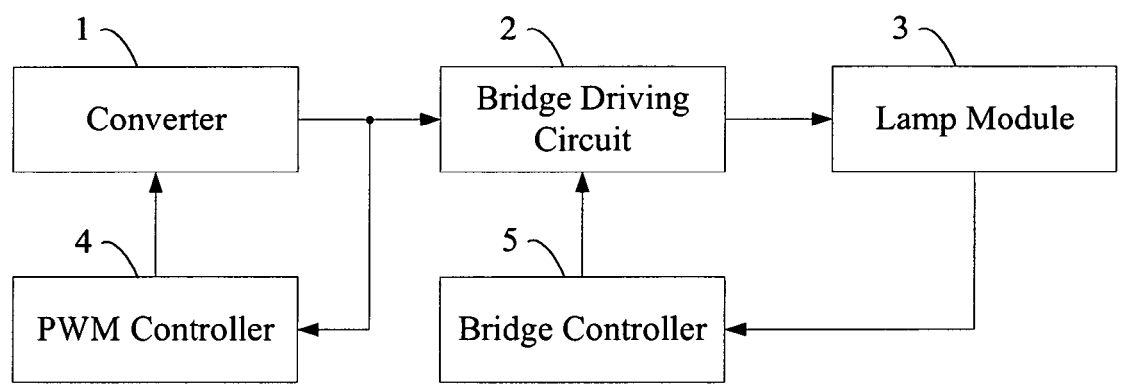
FIG. 5 is a block diagram of a conventional system for driving plural lamps.

FIG. 4 is a block diagram of a fourth embodiment of a system for driving plural lamps in accordance with the present invention. The circuit structure of FIG. 4 is substantially the same as that of the third embodiment shown in FIG. 3, except that the circuit has a plurality of DC/DC converters 11', 21', . . . , N1' instead of AC/DC converters 11, 21, . . . , N1. The DC/DC converters 11', 21', . . . , N1' receive DC voltages from a power source (not shown), in order to light up the lamps at different preset times.

While particular embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

We claim:

1. A system for driving a lamp module, the lamp module comprising a plurality of lamps, the system comprising:
   a converter for converting a received voltage to a direct current (DC) voltage;
   a driving circuit for converting the DC voltage to an alternating current (AC) voltage;
   a pulse width modulation (PWM) controller for connection between the converter and the lamp module, for regulating the DC voltage outputted from the converter according to current flowing through the lamp module; and
   a bus inverter controller for connection between the driving circuit and the lamp module, for regulating a working frequency thereof and controlling the AC voltage output from the driving circuit when the lamps are turned on.

2. The system as recited in claim 1, wherein the driving circuit is a royer circuit.

3. The system as recited in claim 1, wherein the converter comprises an AC/DC converter, for converting an AC voltage to a DC voltage.

4. The system as recited in claim 1, wherein the converter comprises a DC/DC converter, for converting a DC voltage to another DC voltage.

5. The system as recited in claim 1, wherein the driving circuit is a half-bridge circuit.

6. The system as recited in claim 1, wherein the driving circuit is a full-bridge circuit.

7. The system as recited in claim 1, wherein the driving circuit is a push-pull circuit.

8. A system for driving a plurality of lamp modules, each lamp module comprising a plurality of lamps, the system comprising:
   a plurality of converters for converting received voltages to direct current (DC) voltages;
   a plurality of driving circuits for converting the DC voltages to alternating current (AC) voltages; and
   a multi-phase pulse width modulation (PWM) controller for connection between the converters and the lamp modules, for regulating the DC voltages outputted from the converters according to currents flowing through the lamp modules.

9. The system as recited in claim 8, wherein the driving circuits are royer circuits.

10. The system as recited in claim 8, further comprising a bus inverter controller for connection between the driving circuits and the lamp modules, for regulating a working frequency of the bus inverter controller and controlling the AC voltages outputted from the driving circuits when the lamps are turned on.

11. The system as recited in claim 8, wherein the converters comprise AC/DC converters, for converting AC voltages to DC voltages.

12. The system as recited in claim 8, wherein the converters comprise DC/DC converters, for converting DC voltages to other DC voltages.

13. The system as recited in claim 11, wherein the multi-phase PWM controller outputs control signals to the corresponding converters to receive the AC voltages in different preset periods.

14. The system as recited in claim 8, wherein the multi-phase PWM controller controls DC voltages outputted from different converters in different preset periods to turn on corresponding lamp modules.

15. The system as recited in claim 8, wherein the driving circuits are half-bridge circuits.

16. The system as recited in claim 8, wherein the driving circuits are full-bridge circuits.

17. The system as recited in claim 8, wherein the driving circuits are push-pull circuits.

18. A system for driving at least one lamp module having lamps installed therein, comprising:
   a converter electrically connectable with a power source so as to accept power voltage from said power source and convert said voltage passing therethrough;
   a driving circuit electrically connectable between said converter and at least one corresponding lamp module so as to accept said converted voltage from said converter and provide output voltage thereof to said at least one lamp module based on said converted voltage; and
   a controller electrically connectable between said at least one lamp module and said driving circuit so as to accept current signals from said at least one lamp module and regulate a working frequency thereof for controlling said output voltage of said driving circuit when said at least one lamp module is turned on.

19. The system as recited in claim 18, further comprising a pulse width modulation (PWM) controller electrically connectable between said at least one lamp module and said converter in order to regulate said converted voltage according to said current signals accepted from said at least one lamp module.

* * * * *